United States Patent [19]  [11] 4,140,421
Lloyd  [45] Feb. 20, 1979

[54] SOIL IRRIGATION SYSTEM

[75] Inventor: Henry G. Lloyd, Binningen, Switzerland

[73] Assignee: Verdyol International AG, Allschwil, Switzerland

[21] Appl. No.: 863,497

[22] Filed: Dec. 22, 1977

[30] Foreign Application Priority Data

Dec. 22, 1976 [CH] Switzerland ............. 16216/76

[51] Int. Cl.$^2$ ............................................. E02B 13/00
[52] U.S. Cl. ............................................. 405/43; 210/455
[58] Field of Search ................... 61/12, 13, 10, 11; 47/485; 210/455

[56] References Cited

U.S. PATENT DOCUMENTS

| 3,046,747 | 7/1962 | Timpe | 61/13 |
| 3,050,801 | 8/1962 | Downey | 61/12 |
| 3,830,373 | 8/1974 | Sixt | 61/11 |

FOREIGN PATENT DOCUMENTS

| 938850 | 2/1956 | Fed. Rep. of Germany | 61/10 |
| 1200303 | 6/1959 | France | 61/13 |
| 148295 | 12/1962 | U.S.S.R. | 61/12 |

*Primary Examiner*—Jacob Shapiro

*Attorney, Agent, or Firm*—Ladas, Parry, Von Gehr, Goldsmith & Deschamps

[57]  ABSTRACT

The invention relates to a soil irrigation system comprising subterranean distribution pipes for distributing water to overlying soil, each pipe having a perforated upper wall whose outer surface is covered with water permeable means for preventing said overlying soil from fouling the perforations of said upper wall, and means integral with the remaining wall structure of said pipe for retaining said water permeable means in its covering relationship with said upper wall; said water permeable means being a unitary layer of capillary material which, in addition to its antifouling function, aids in equilizing the outflow of water from all the perforations in said upper wall of the pipe from one end of the pipe to the other; and said retaining means being integral also with said upper wall and is provided with a pair of inwardly projecting cams which overlie and positionally secure the respective longitudinal side edges of said unitary layer of capillary material, said retaining means being constructed to prevent any water flow laterally out of said unitary layer, whereby the outflow of water from said unitary layer is constrained to move only in an upward direction.

4 Claims, 20 Drawing Figures

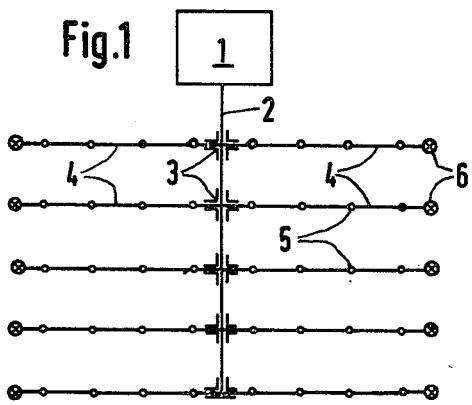
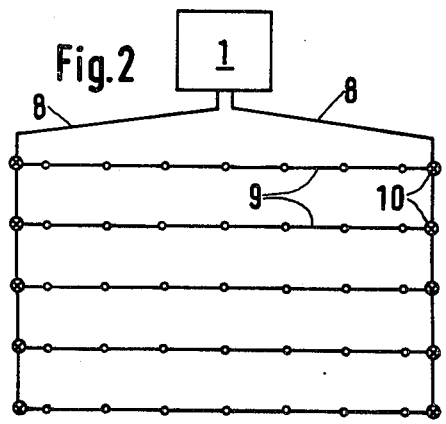
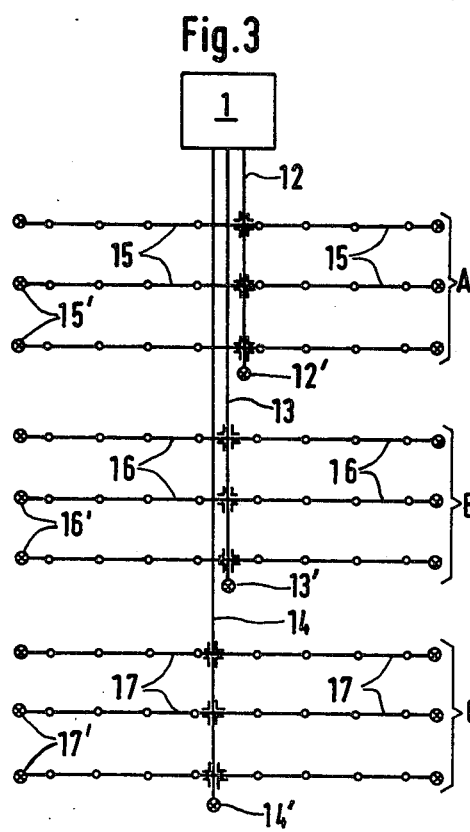
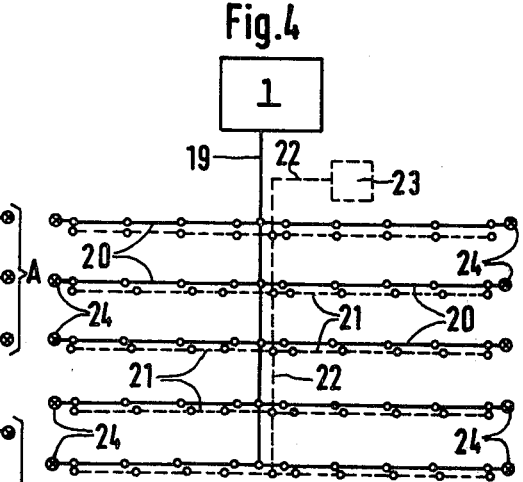
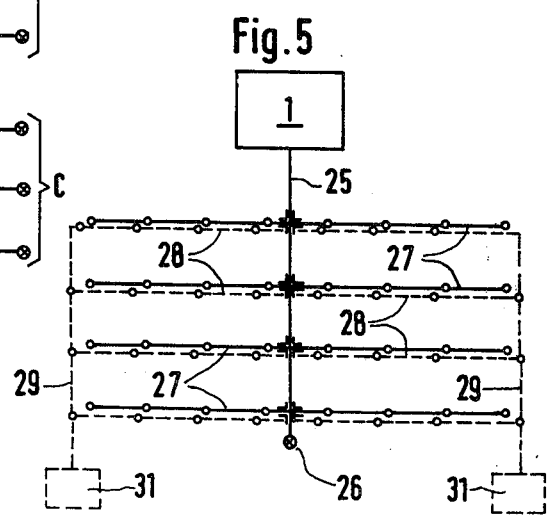

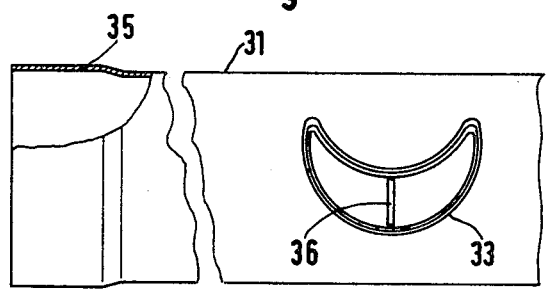
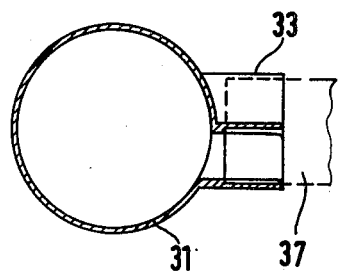
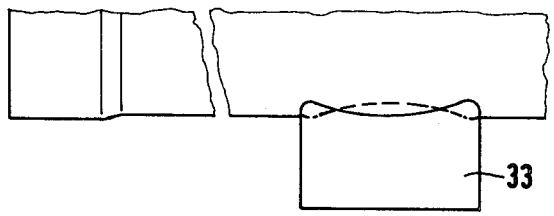
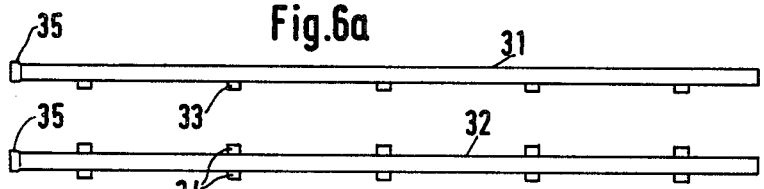
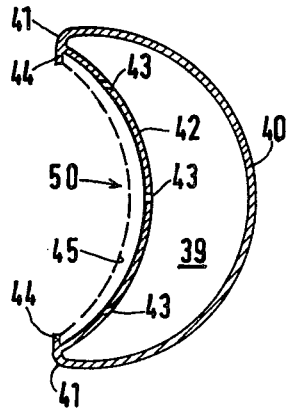
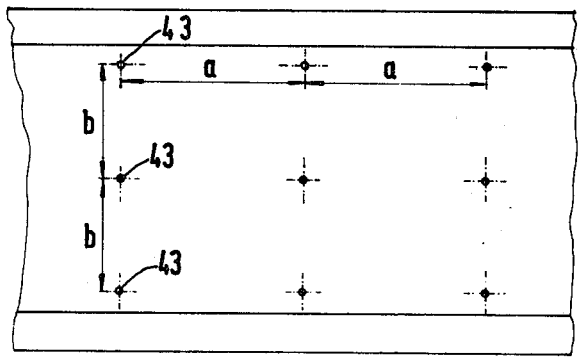

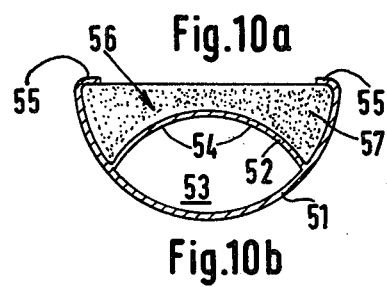
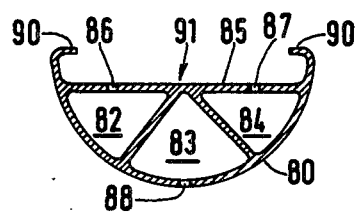
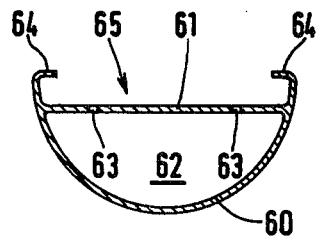
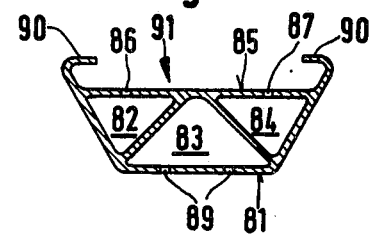
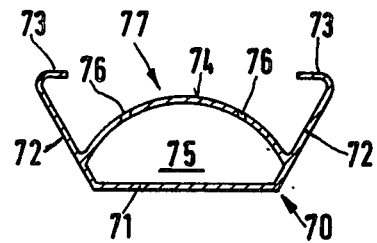
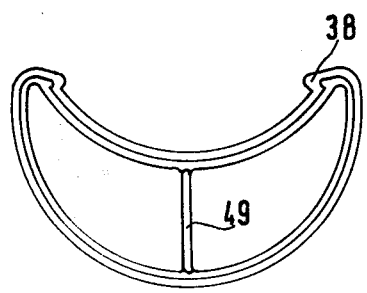
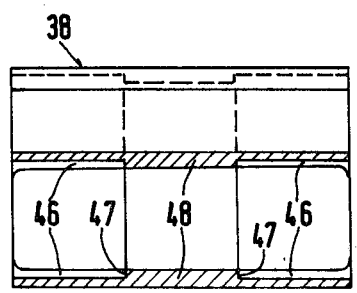

SOIL IRRIGATION SYSTEM

Among the well-known soil irrigation methods such as spraying, flooding, furrow and overhead irrigation etc., subterranean irrigation belongs to the historically, oldest types of irrigation for arable land on which plants should grow. Plants can only take up their nutritions substances in a water-soluble compound. But it must be noted that excess water is damaging to many plants and can also cause erosion. Therefore, a regular, controllable supply of water and an eventually necessary possibility of drainage are of great importance.

Irrigation by sprinkling has proved especially useful for gardening and intensive horticulture in zones with moderate climates but not in hot countries or areas with a high salt content in the earth or water. Water loss through evaporation during sprinkling can be considerable.

Very large quantities of water are required for irrigation by flooding so that this type of irrigation can only be used where a great deal of water is available. Furrow irrigation is often used in agriculture as it can be run without very much technical expenditure. But again, large quantities of water are required since water-loss through evaporation and percolation is high. The overhead method of irrigation mentioned previously is aimed at the watering of plants and is hardly ever used on large areas.

A known method of subirrigation suggests building separate inlet and outlet valves into subterranean distribution pipes with a single flow channel, whereby the outlet valves should be pressure-controlled, i.e. they should not open until the water pressure in the pipe or pipe system is substantially higher than the static pressure. The inlet valves are for drainage purposes, i.e. they should open when the soil contains surplus water. However, experience has shown that such an irrigation system only works perfectly as long as the valve seats are clean. Even the smallest amount of dirt, e.g. grains of sand or earth can prevent the system from working as intended and thereby also prevent faultless irrigation or drainage.

It is the object of the present invention to suggest an irrigation system which works without valves, both for irrigation and drainage, and which requires practically no maintenance and minimal operational expenditure. Such demands are made especially of an irrigation system for development and urbanization of dry areas such as deserts or prairies, where little water is available. These demands are increasingly made of systems in temperate climates where water is becoming progressively rare. But watering problems also occur in sport centres and parks where overhead irrigation is not possible because the lawns are always in use by the public or because it would take too much time.

The irrigation system according to the present invention achieves these objects and is characterized in that each of the distribution points comprises at least one branch piece connected to a feed water pipe, a distribution pipe practically vertically arranged in respect to the feed water pipe running from the branch piece in the form of a plug connection, that the distribution pipe is a tube profile with at least one channel area and a recess facing the earth's surface, this recess extending over the whole length of the distribution pipe; whereby the base of this recess is the outer side of a cover plate integral with the tube profile, and the base contains a number of openings which end in said channel area; that the recess is laterally limited by a pair of cams with back tapers facing each other; and that a filter element which lays at least partly on the cover plate and at the side in the back tapers of the cam is positioned in the recess for dosage of the amount of water outflow out of said channel area and for avoidance of the entry of sand and earth into the openings.

The invention will be fully understood from the following description, read in connection with the accompanying drawings in which:

FIGS. 1 to 5 show a schematical view of possible variations of the irrigation system according to the invention.

FIGS. 6a and 6b show an embodiment of feed pipe sections with one and two sided branch or connection elements for the coupling of distribution pipes, FIGS. 7e–e show an elevated, side and cross-section view of a branch of a feed pipe as in FIGS. 6a, 6b on a larger scale, FIGS. 8a, 8b show a first embodiment of a distribution pipe in cross-section and the view from above, FIGS. 9a, b show a cross-section of a coupling point arrangement for the connection of adjacent distribution pipe sections to form distribution pipes of any length and FIGS. 10a–f show various cross-section forms of distribution pipe profiles in accordance with the distribution pipe profile shown in FIG. 8.

Five examples of the arrangement of soil irrigation systems according to the present invention are shown in FIGS. 1–5. The points marked 1 in the figures show a pumping station or quite generally a source of supplying the irrigation equipment with water. In FIG. 1 a single feed pipe 2 is provided, to which distribution pipes 4 are connected by means of branch pieces 3. Details regarding the feed pipe 2 are found later in the descriptions of FIGS. 6a, b and 7a–c and details regarding the distribution pipes 4 are given in FIGS. 8a, b, 9a, b and 10a–f. Outflow openings 5 are arranged along the distribution pipes 4 as explained later according to FIG. 9.

At the outer end of each distribution pipe 4, de-aerating fittings 6 are positioned to avoid air-pockets. The feed pipe 2 and the distribution pipes 4 lay practically horizontally or slanting slightly towards the connection point in the ground. The pressure in the feed pipe and in the distribution pipes is so chosen that, on the one hand, each of the outflow openings is supplied with practically the same amount of water and, on the other hand, that no flooding of the earth can occur. Probes (not shown) can be arranged over the whole irrigation area to determine the moisture content of the earth.

FIG. 2 shows an irrigation system with two preferably shunted feed pipe sections 8, 8', which supply the distribution pipes 9 at both ends with water. De-aerating fittings 10 are positioned at or nearby the connection points of the feed pipes 8, 8' to the distribution pipe 9. It is understood that the distribution pipes of such a pipe system must slope towards the middle of their length in order to function properly.

FIG. 3 is a schematic representation of an embodiment by which separate irrigation areas A, B and C are supplied by a single pumping station or source 1 over separate feed pipes 12 13 and 14. The irrigation areas A–C can be for example, terraced areas at differing heights or fields with unequal water requirements or plantations, laying relatively far apart from each other. A number of distribution pipes 15, 16, 17 are connected to each of the feed pipes 12, 13, 14 as shown in FIG. 1. A de-areating fitting 12', 13', 14' is arranged at the end of each feed pipe and a de-aerating fitting 15', 16', 17' is arranged at the end of each distribution pipe 15, 16, 17. The feed pipes 12, 13, 14 are kept on varying output pressures depending on the height of the single areas A, B and C or their distance from the pumping station or source 1. This is in order to feed each outflow opening in the respective distribution pipes with practically the same quantity of water.

It is understood that drainage means (not shown) can be put into operation in systems according to FIGS. 1 and 2 in order to avoid flooding; these drainage means having water removal elements at any point in the area of the irrigation system.

FIG. 4 shows an irrigation system according to the present invention which also contains a means for drainage besides the water supply to a cultivated area. Distribution pipes 20 are connected to a feed pipe 19. Drainage channels 21 are arranged parallel to the distribution pipes. The drainage channels can be installed separately and connected to a collecting pipe 22, or be sections of the distribution pipes as described later according to FIGS. 10a and 10e. At one end of the collecting pipe 22, a drainage pit 23 is arranged, in which the drainage water is collected. This can, of course, lead back to the irrigation system especially if there is insufficient water. In the case of an irrigation system according to FIG. 4, it is appropriate to lay the distribution pipes 20 sloping downwards to the feed pipe 19 and to arrange de-aerating fittings 24 at their outer ends.

FIG. 5 shows a further embodiment of the irrigation system according to the present invention, showing a feed pipe 25 with a de-aerating fitting 26 arranged at its outer end. On both sides of the feed pipe 25, distribution pipes 27 are connected and provided with drainage pipes. The distribution pipes 27 and the drainage pipes 28 slope gently outwards from the feed pipe 25 so that the drainage water can flow out into collecting pipes 29. From there it goes into drainage pits 31 which, as described using FIG. 4, can be connected to the pumping station 1.

FIGS. 6a, b show feed pipe lengths 31, 32 with one and two-sided positioned connection pieces 33, 34 which are arranged at distances of 80-120 cm in respect of one another along the feed pipe. A coupling sleeve 35 is arranged at one end of the pipe lengths 31, 32 to form feed pipes of any length.

FIGS. 7a, b, c show, partly in side elevation and partly in cross-section, details of the coupling section and connection point for a distribution pipe to a pipe 31 according to FIG. 6a. The same parts are marked with the same reference numbers in FIGS. 6a and 7a-c.

As is seen particularly in FIG. 7a, the coupling sleeve 35 is arranged as a socket into which the end of an adjacent pipe length (not shown) or a T or cross-shaped branch piece (also not shown) can be inserted. A connection piece 33 rises up sidewards over the pipe length 31, the form of this connection piece being chosen so that a distribution pipe of the form shown in FIG. 8, can be directly inserted. The connection piece 33 has a reinforcing member 36 to improve its stability. With a connection piece of this type, the end of a distribution pipe 37 is pushed into the connection piece. It is understood that the connection piece can also be formed in such a way that the respective end of the distribution pipe can be pushed over the outer side of the connection piece. Other cross-section forms of the branch piece 3 are possible, as for example, a lens-shaped one for the connection of a distribution pipe as shown in FIG. 10a.

The profile of a distribution pipe with crescent-shaped conducting transverse section 39 is shown in cross-section and in top view in FIGS. 8a, b. A concave cover plate 42 which is integral with a supporting wall 40, is connected to the ends 41 of the supporting wall 40. The cover plate 42 contains a number of openings 43 of 2.5-3.5 mm diameter which are arranged at regular intervals a and b (lengthwise and laterally) and which allow the water to pass through from the conducting channel 39 to the earth surrounding the distribution pipe. Holding cams 44 are arranged between the supporting wall 40 and the cover plate 42 at the connection points 41, these cams, together with the surface of the cover plate 42, limiting a recess marked 50, in which a porous, capillary covering layer 45, marked with a dotted line, is arranged. The material of the covering layer 45 is preferably rot-proof, non-woven glass fibre material or plastic. The thickness of the covering layer depends on the material used and is 0.5-2.5 mm, preferably 1 mm by non-woven glass fibre or about 5-6 mm with an open-pored foam plastic. It is the job of the covering layer to stop the entrance of sand or earth particles into the openings 43 and the conducting transverse section 39. It serves also to check the free flow of the water so that the water flows out not only through the opening 43 which is nearest the feed pipe, but also through the openings which are further away.

Because on the one hand, depending on requirements, the distribution pipes can be very long, but on the other hand should not have a single-pipe length of more than 4-6 m for comfortable handling and transport to the place of use, connection sleeves 38 are necessary to reliably connect the pipe ends. A sleeve of this type is shown in FIGS. 9a, b, the form of this sleeve being adapted to the cross-section according to FIG. 9a of the distribution pipe used. The sleeve 38 has back tapers 46 which extend over at least a third of its length and which are formed to take up the ends of the adjacent distribution pipes. Stop shoulders 47 are arranged on both sides of an elevation 48 at the inner ends of the pipe to assure central positioning of the sleeve 38 at a buffer point between the two distribution pipe ends. On the longitudinal middle of the elevation 48, a reinforcing member 49 is positioned which serves to strengthen the sleeve 38 or to generally strengthen the distribution pipe connection.

Whilst FIGS. 8 and 9 only show distribution pipes with a crescent-shaped cross-section and single opening, FIGS. 10a, 10c, 10d and 10f show other cross-section shapes with a single opening. In FIG. 10a, the cross-section of a distribution pipe is shown with a semi-circular shaped wall 51, the inner side of which is integral with an arched cover plate 52. The under part of the wall 51 and the cover plate 52 limit a lens-shaped conducting channel 53, from which two openings 54 lead to the outer side of the cover plate 52. Cams 55, pointing inwards in profile, are formed at each of the top ends of the wall 51. These cams, together with the outer surface of the cover plate 52, limit a recess 56 and serve as already described according to FIG. 8 to hold a cover layer 57 which, in the case of FIG. 10a is shown as a profile body made of flexible, openpored material. It is understood that the covering layer, as already mentioned, can also be a flat material, the middle section of which lies on the top side of the cover plate 52 and the edges of which, as shown in FIG. 8, can be supported on the inside by the cams 55.

FIG. 10c shows the cross-section of one of the distribution pipes formed similarly to that described above. On the inside of a wall 60 which is semi-circular in its cross-section, is a flat cover plate 61 which, together with the lower section of the wall 60, limits a channel 62 which is connected with the outside of the distribution pipe over openings 63. Cams 64 are formed at the ends of the wall 60, these cams limiting a recess 65 together with the top side of the cover plate 61. A covering layer (not shown) is centralized and secured in this recess.

FIGS. 10d and 10f show cross-sections of further embodiments of distribution pipes according to the present invention by which the outer wall 70 which determines the profile form, is made in three sections. Equivalent parts are marked with the same reference numbers in both figures. Outwards and upwards sloping side walls 72 are formed on a horizontal base section 71. The side walls 72 comprise cams pointing inwards at their top ends. On the inner sides of the side walls 72, cover plates 74 are formed, which, together with the base plate 71 and a section of of the side wall 72, define the conducting channel 75. Each cover plate 74 has openings 76 which connect the channel 75 with the surroundings of the distribution pipe. The cams 73 and the top side of the cover plate 74 limit a recess 77 in which a covering layer (not shown) is centralized.

FIGS. 10b and 10e show cross-sections of distribution pipes, the profile outer wall 80, 81 of which are formed similarly to those described earlier, as in FIGS. 8a, 10a, 10b or in FIGS. 10d and 10e. However, in the embodiment described above, the profile hollow of the single channel is divided into three separate spaces or channels 82, 83, 84 which are limited at the top by a continuous cover plate 85. Parts fulfilling the same function in the two distribution pipe cross-sections according to FIGS. 10b and 10e are marked with the same reference numbers.

Channels 82 and 84 are supplied with openings 86, 87, which connect the respective channel with the surroundings of the distribution pipe. Channels 82 and 84 are designated for supplying irrigation water which leaves the feed pipe through the openings 86, 87.

The middle channel 83 is intended as a drainage channel and can be reached by excess water through the inlet openings 88 and 89. It is understood that the open-bottomed channel 83 can also be used for irrigation purposes by respective connection of channels 82, 83 and 84.

Distribution pipes according to FIGS. 10b and 10e are used in irrigation systems which are built, for example, according to FIGS. 4 and 5. Drainage of excess water (rain, excess irrigation water etc.) can of course also be arranged through the openings 86, 87 if the feed pipe can be connected accordingly. It can be generally said that irrigation systems according to FIGS. 1–3 can also have distribution pipes as shown in FIGS. 10b and 10e.

The material for the feed pipes, distribution pipes, de-aerating fittings, connection sleeves, end sections etc. described above is, for various reasons, preferably plastic. Polypropylene, polyethylene and polyvinyl chloride plastics are especially suited. The properties of these plastics are seen from the following table. The table shows which plastic is most advantageous for a particular system.

| Property | Polyprop. | Polyeth. | PVC |
| --- | --- | --- | --- |
| Heat resistance over 50° C. | very good | poor | poor |
| Resistance under 0° C. | very good | very good | poor |
| Impact resistance at a temp. of 20° C. | very good | very good | poor |
| Relative weight in relation to the other plastics: | light | light | heavy |
| Rupture resistance at 20° C. | good | poor | very good |
| Chemical resistance: | | | |
| a) to acid, alkali | good | good | good |
| b) to solvents | good | good | poor |

The advantages which can be realised with the present invention for irrigation of cultivated land are, above all, that:

the water can be led exactly to the root area of the plants, water loss through evaporation or percolation is minimal, the amount of water going to the earth can be easily and exactly controlled depending on the cultivation, excess water in the earth can be drained off via the same pipes as those which conduct the water, nutritions substances can be added to the feed water, continuous control of the water quality in regard to conductivity, temperature and pH-value can be made, the moisture present in the earth can be relatively easily determined and the irrigation can be aimed and, if applicable, automatically controlled and there is the possibility to easily de-aerate and ventilate the pipe system.

What we claim is:

1. In a soil irrigation system comprising subterranean distribution pipes for distributing water to overlying soil, each pipe having a perforated upper wall whose outer surface is covered with water permeable means for preventing said overlying soil from fouling the perforations of said upper wall, and means integral with the remaining wall structure of said pipe for retaining said water permeable means in its covering relationship with said upper wall, the improvement wherein:

(a) said water permeable means is a unitary layer of capillary material which, in addition to its anti-fouling function, aids in equalizing the outflow of water from all the perforations in said upper wall of the pipe from one end of the pipe to the other; and (b) said retaining means is integral also with said upper wall and is provided with a pair of inwardly projecting cams which overlie and positionally secure the respective longitudinal side edges of said unitary layer of capillary material, said retaining means being constructed to prevent any water flow laterally out of said unitary layer, whereby the outflow of water from said unitary layer is constrained to move only in an upward direction.

2. The improvement according to claim 1, wherein said pair of inwardly projecting cams are disposed at upper longitudinal edges of respective imperforate side flanges of said retaining means, said flanges rising from respective junctures of said upper wall with said remaining wall structure of said pipe and forming, with said cams and said upper wall, a pocket for receiving said unitary layer of capillary material.

3. The improvement according to claim 1, wherein said pipe is divided into a plurality of separate channels, at least one of which is for supplying water to said overlying soil through said perforated upper wall and unitary layer, at least another of which is a water drainage channel non-communicative with the perforations of said upper wall and adapted to receive water exterior of said pipe.

4. The improvement according to claim 3, wherein said water drainage channel is provided with at least one inlet opening on the lower side of said pipe.